(No Model.)

C. F. PIKE.
WATER CLOSET.

No. 271,917. Patented Feb. 6, 1883.

Witnesses
M. H. Coonauger
W. H. Van Horn

Inventor
Charles F. Pike
By S. J. Vanstavoren
Attorney

United States Patent Office.

CHARLES F. PIKE, OF PHILADELPHIA, PENNSYLVANIA, ASSIGNOR TO THE NATIONAL ANTI-SEWER GAS COMPANY, OF CAMDEN, NEW JERSEY.

WATER-CLOSET.

SPECIFICATION forming part of Letters Patent No. 271,917, dated February 6, 1883.

Application filed July 31, 1882. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Water-Closets, of which the following is a specification, reference being had therein to the accompanying drawings, wherein—

Figure 1:
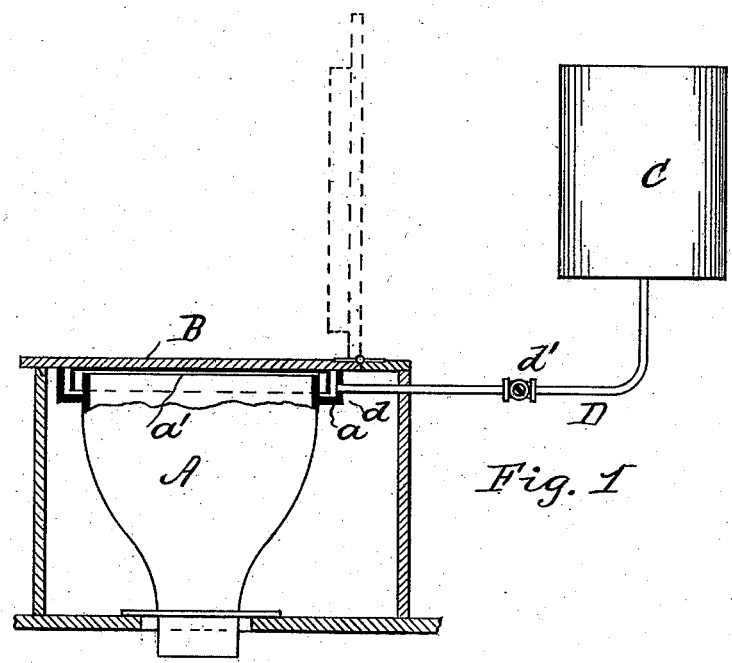
Figure 2:
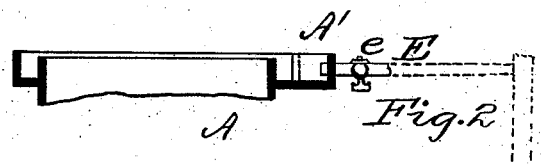
Figure 3:
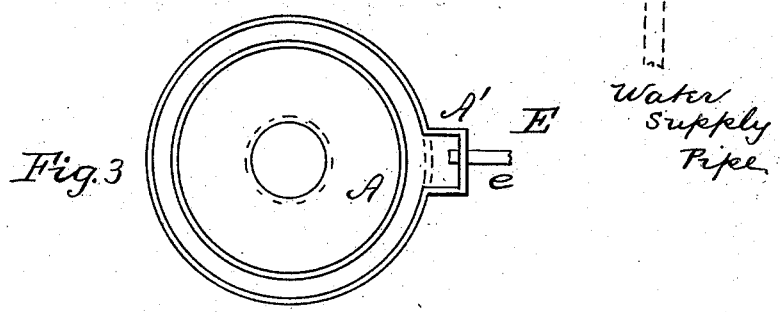

Figure 1 is an elevation, partly sectional, of a water-closet embodying my invention. Fig. 2 is a detail view, showing a modification; and Fig. 3 is a plan of Fig. 2.

My invention has for its object to provide a seal for water-closet bowls, traps, &c., which will prevent sewer-gas passing through or escaping from such fixtures.

My invention accordingly consists in the combination, with a water-closet bowl, trap, &c., of means, as hereinafter specifically described and claimed, whereby a disinfectant fluid may be continuously or intermittently caused to flow to the bowl or trap to seal the same.

Referring to the accompanying drawings, which show the application of my invention to that class of water-closets wherein the bowl A has a sealing-trough, $a$, in its top edge, into which a flanged disk or a cap, B, is designed to enter and be sealed by the fluid in said trough to form an air-tight cover for such bowl, C represents a reservoir located at any suitable place in relation to the water-closet, and is designed to hold a fluid disinfectant; or such material may be in a solid or powdered condition, and water be permitted to flow thereto to gradually dissolve the same. From the reservoir leads a pipe, D, connected at $d$ with trough $a$, and is provided with a stop-cock, $d'$.

The operation is obvious. When the cock $d'$ is turned or opened the disinfectant from reservoir C passes into the trough $a$ and forms a seal for cap B. Any sewer-gas entering bowl A is either absorbed by such disinfectant or neutralized thereby.

If desired, the cock $d'$ may be so regulated that a continuous small flow of the disinfectant is provided for trough $a$, such liquid rising therein until it overflows the edge $a'$ of the bowl, and thence passes through the same to the trap and soil-pipe. In such case a running seal is provided for the bowl, trap, and main or soil-pipe trap, insuring therefor absolute preventation of the escape of sewer-gas from the bowl A into the apartment wherein the same may be located; or the cock $d'$ may be opened and closed at intervals of more or less duration, in order to provide an intermittent running seal for the bowl or trough $a$. When the last-described seal is used the quantity of disinfectant supplied to trough $a$ may be varied as desired. The intervals between the flow of the disinfectant should not be such to permit the liquid in trough $a$ to become saturated with gas; but they should be so regulated that before such event takes place a new supply is admitted to said trough. So, too, instead of placing the disinfectant in a separate reservoir, as shown in Fig. 1, the bowl A may be provided with a pocket, A', for the reception of such material. A branch pipe, E, with valve $e$, from the supply or flushing pipe, connects with such pocket, as shown in Fig. 2. As the water from pipe E passes into pocket A' the disinfectant therein commingles with such water to form a disinfecting sealing-fluid for trough $a$, as above described.

I have shown and described but one form of water-closet; but I do not limit my invention thereto, as it may be applied to any of the well-known or other forms of closets, as fully described and shown in applications for patent of even date herewith, and which therefore need not be more particularly described.

The cock $d'$ may be operated manually, or mechanism may be provided for automatically operating said cock, such mechanism being connected to the seal-lid or other suitable points of attachment.

If desired, the pipe D may lead to the soil-pipe or its trap, in order that a charge of disinfectant may be allowed to flow therein.

What I claim as my invention is—

1. The combination, with a water-closet having a sealing-chamber, of a reservoir for holding disinfectants, and a pipe-connection for said reservoir, provided with a stop-cock for regulating the flow of disinfectant material to said closet, substantially as shown and described.

2. In combination, with a water-closet bowl having a trough in its upper edge, of a flanged cap adapted to enter said trough, and a reservoir for holding a disinfectant, arranged substantially as shown and described, whereby a running or intermittent disinfectant seal is provided for said trough, substantially as set forth.

In testimony whereof I affix my signature in presence of two witnesses.

CHARLES F. PIKE.

Witnesses:
S. J. VAN STAVOREN,
CHAS. F. VAN HORN.